July 14, 1964   R. R. HARRISON ETAL   3,140,716
HEAT EXCHANGER FOR BLOOD
Filed June 26, 1961
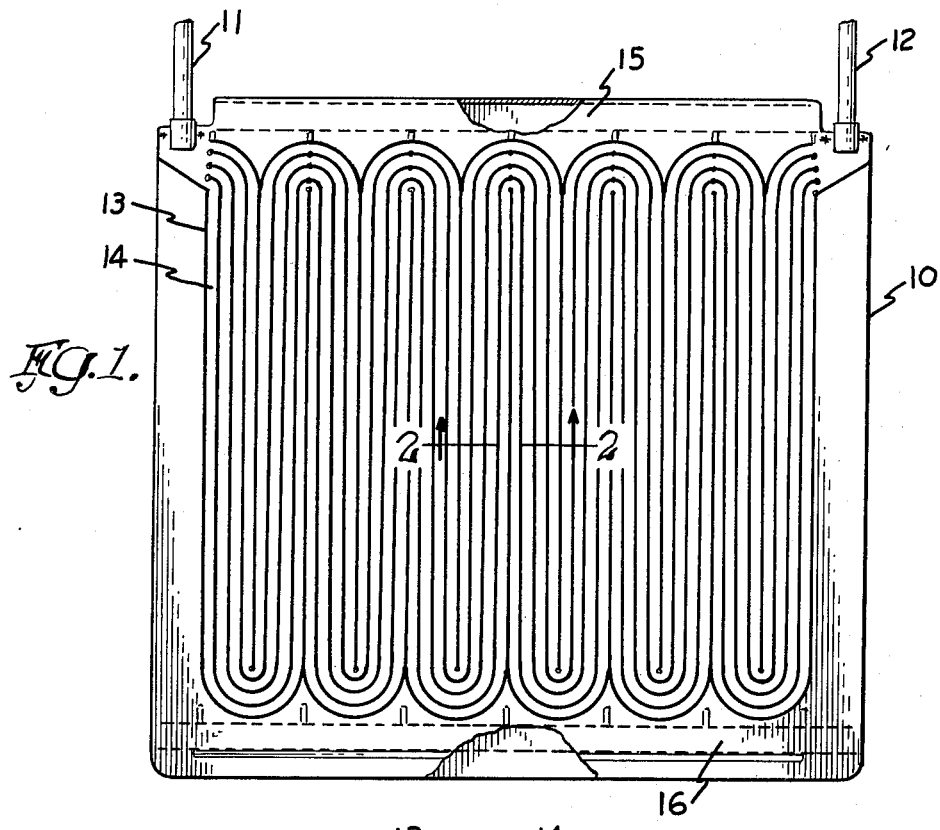
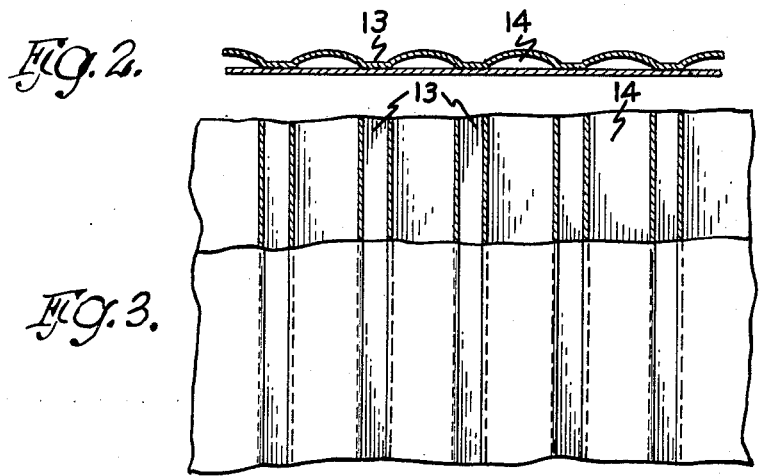
Inventors
Robert R. Harrison
Leonard F. Waldman, Jr.

United States Patent Office 3,140,716
Patented July 14, 1964

3,140,716
HEAT EXCHANGER FOR BLOOD
Robert R. Harrison, Park Ridge, and Leonard F. Waldman, Jr., Niles, Ill., assignors to Baxter Laboratories, Inc.
Filed June 26, 1961, Ser. No. 119,537
1 Claim. (Cl. 128—399)

The present invention relates to a device for use in varying the body temperature of a living animal. More particularly, it relates to a novel heat exchanger for varying the temperature of the blood of a living animal and thereby varying its body temperature.

The desirability of being able to vary, at will, the body temperature of a living animal is well recognized in the field of surgery. The lowering of the body temperature of a limb, for example, may make possible the performance of a so-called "bloodless" operation. Lowering of the body temperature may also make it possible for the heart surgeon to immobilize and by-pass the heart through use of an artificial-heart lung machine, thereby making it possible to perform operations on the heart itself.

In the past, various attempts have been made to develop devices that would make it possible to quickly and accurately vary the body temperature of a living animal. Although such obvious approaches as immersing the animal in hot or cold baths have been used, the most promising approach to the problem has been to connect a heat exchanger located exteriorly of the animal's body, into the circulatory system of the animal, circulate the blood through the heat exchanger to vary its temperature and then return the blood to the animal via its circulatory system. The extensive network of veins, arteries and smaller blood vessels of the animal's circulatory system makes it possible by circulating the warmed or cooled blood to quickly and effectively lower or raise the body temperature of the animal. (See U.S. Patent No. 2,876,769.) Even the use of the exteriorly located heat exchangers, however, has not been completely satisfactory because of serious disadvantages inherent in the heat exchangers employed. The heat exchangers employed treating blood to date have been unsterile, pyrogenic, non-expendable, difficult to clean, easily breakable, non-transparent, bulky, hemolysis inducing, air bubble entrapping, or simply inefficient. In most instances the devices have possessed combinations of at least two or more of these defects.

It is, therefore, an object of the present invention to disclose a novel heat exchanger which does not possess the disadvantages of the prior art devices.

It is further an object to disclose a novel sterile, non-pyrogenic, expendable heat exchanger which because of its unique construction eliminates the entrapment of air bubbles and inhibits the hemolysis of the blood.

It is still further an object to disclose an expendable plastic heat exchanger of superior heat exchange properties for use in the extracorporeal circulation of blood.

In accordance with the invention, a selected vein or artery of the circulatory system of the animal is cut and a tube connected thereto, the other end of the tube leads either directly or indirectly to the improved heat exchanger of the present invention, a second tube leading from the outlet of the improved heat exchanger is connected into the circulatory system of the animal to provide a closed system. The heat exchanger by means of this arrangement becomes part of the circulatory system of the animal. The heat exchanger, of course, is suspended or otherwise disposed in or about a suitable cooling or heating device so that a heat exchange can take place. Generally the heat exchanger is used in combination with an artificial heart-lung device. (See Great Britain Patent No. 853,994.) Usually the combination is so arranged that the venous blood first passes into a blood reservoir from which it is pumped into the heart-lung device where it is oxygenated. It is then pumped through the heat exchanger where the temperature is varied. The blood is then finally allowed to flow or more conventionally is pumped back into the animal's circulatory system.

For further comprehension of the invention, and of the objects and advantages thereof, reference will be had to the following description and accompanying drawings, and to the appended claim in which the various novel features of the invention are more particularly set forth.

In the accompanying drawings:

FIGURE 1 is a perspective view of the novel heat exchanger;

FIGURE 2 is a partial cross-sectional view of the heat exchanger taken along line 2—2 of FIGURE 1 and showing in detail the cross-sectional areas, of several fluid passageways and heat seals;

FIGURE 3 is an enlarged sectional view of the novel heat exchanger showing in greater detail the structure of the surface of the novel heat exchanger.

Referring now more specifically to the drawing, there is shown at 10 a flexible liquid conducting panel provided with an inlet tube 11 and an outlet tube 12.

The panel 10 is preferably formed by heat sealing a single sheet of thermoplastic material folded back upon itself, or a pair of superposed sheets of thermoplastic material along spaced parallel lines 13 to define a plurality of tortuous, serpentine passageways 14 between the seal lines through which liquid can be circulated. As seen in FIGURE 1, the flow pattern comprises four parallel serpentine passageways of equal length which are manifolded by a common inlet and a common outlet. This pattern provides the necessary filming of blood and the required heat exchange surface area without the need for the corresponding pressures which would be needed to pump the blood through a single channel unit of comparable surface. The elimination of the sharp corners and blind recesses in the flow configuration reduces the hemolysis of blood within the unit and facilitates the clearing of dangerous air bubbles from the blood flowing in the extracorporeal circulation.

In the preferred embodiment, the panel 10 is formed by heat sealing two 14 by 15 inch sheets of .015 inch thick polyvinyl plastic to form the previously described serpentine flow pattern. The four channels or passageways formed are each approximately 11 feet long and ⅛ inch apart and equivalent in heat exchanging ability to forty-four (44) feet of three thirty-seconds (3/32) inch diameter tubing provided with minimal wall thickness. Generally it is preferred to heat seal the panel 10 along the top and bottom edges as well, to form the sleeves 15 and 16 if the panel is prepared from two sheets or along the bottom edge only, if the panel 10 is formed from a single sheet folded back upon itself.

The sleeve 15 provides a convenient receptacle for a horizontal hanging bar (not shown) which is used to suspend the heat exchanger in a vertical position within an ice water or cold brine bath or other temperature varying apparatus. The lower sleeve 16 provides a convenient holder for a metal rod or ballast bar which by virtue of its rigidity and weight prevents the panel from curling or twisting during use.

While the application of conventional heat sealing practice results in the formation of a heat exchanger which may be used with advantage, it has been unexpectedly discovered that an even more desirable heat exchanger which minimizes the risk of hemolysis may be formed by controlling the amount of pressure exerted by the die upon the sheeting during the heat sealing operation. This is conveniently done by inserting several stops into the heat sealing apparatus. These may simply comprise projection extending upwardly from the working surface thereby preventing the die from exerting its full force on the plastic sheets. Controlling of the amount of pressure exerted by the die during heat sealing minimizes the amount of melt which will be extruded into the passage 14 and results in the passage formation (seen only in FIGURE 2) which is most conducive to blood filming on the heat exchanger surface and therefore most efficient. Preferably the force exerted by the die is controlled so that when heat sealing the two previously mentioned sheets of .015 inch polyvinyl plastic the die only compresses the material to about .020 inch thickness. The passage formed in the preferred embodiment measures approximately 3/16 inch in width and the distance between the upper and lower plastic sheet approximates 1/32 to 1/64 of an inch. A heat exchanger constructed in accord to the previous described specifications and embodying the preferred type of heat seal has sufficient capacity to use in heating and cooling blood passing through it at rates up to 500 c./min. If higher flow rates are required, several of the devices can be utilized in a parallel bank to accommodate the greater flow rate.

Although plastic has never been considered a particularly good conductor, it has been found that by employing a single unit of the preferred construction of heat exchanger and a circulating ice water bath, the normal temperature of blood which is 37° C. can be lowered at much as 22° C. at flow rates up to 500 cc./minute.

The following table presents the results obtained with the preferred form of the heat exchanger using an ice water bath and differing flow rates.

| Flow Rate, ml./min. | Temp. of Blood Entering Heat Exchanger, °C. | Bath Temp., °C. | Final Temp. Blood, °C. | Drop in Temp. Blood, °C. |
| --- | --- | --- | --- | --- |
| 100 | 39 | 1 | 3 | 36 |
| 200 | 39 | 1 | 6½ | 32½ |
| 300 | 39 | 1 | 10 | 29 |
| 500 | 39 | 1 | 17 | 22 |

This range of temperatures includes all the temperature variations indicated as desirable by almost all the various proponents of the use of hypo- and hyperthermia. For example, cardiac arrest occurs when the blood is less than 12° C. The preferred form of heat exchanger also performs more than adequately where it is desired to increase the temperature of the blood. However, increases in the temperature of the blood are rarely indicated and the blood can only be raised a few degrees above 39° C. before the protein coagulates.

It will, of course, be understood that temperature variations can also be achieved by using other cooling devices such as refrigerating coils and the like or by employing super cooled or super heated bath solutions in place of the ice water bath.

The novel heat exchanger of the present invention is far superior to previously utilized devices. By virtue of its construction of polyvinyl chloride resin or if desired, tetrafluoroethylene resin, florinated ethylene-propylene resin or similar heat sealable material, it is relatively easily fabricated, sterilized and is, of course, expendable in nature. The smooth plastic material is also hemorepellant or non-wetted by blood thereby reducing the likelihood of hemolysis of the blood.

In addition, the streamlined winding or serpentine flow path eliminates any sharp corners and blind recesses thereby also eliminating the entrapment of air bubbles. Still further, the translucent nature of the material of which the novel heat exchanger is constructed makes it possible to observe the flow of blood through the device thereby providing for a rapid visual check on the operability of the device. The exchanger novel sheet or panel type construction provides significant handling and operation advantages over an unwieldly equivalent length of coiled tubing. The novel preferred slit-like cross-sectional design of the passage provides for an even greater reduction in likelihood of the incidence of hemolysis and provides maximum filming of the blood and correspondingly greater heat exchanging properties. These and still other advantages of the novel heat exchanger of the present invention will be apparent to those skilled in arts of hypo and hyperthermia and surgery.

The heat exchanger of the present invention, of course, in addition to being used as an individual surgical device may be used, if desired, in combination with a wide variety of valves, pumps and artificial organs such as the artificial heart-lung oxygenating system of U.S.P. No. 2,652,831 and U.S.P. No. 2,854,002; the artificial kidney of U.S.P. No. 2,720,879 and similar but unpatented devices in an equally wide variety of surgical procedures.

The embodiments of the invention in which an exclusive property or privilege is claimed are as follows:

In an apparatus for use in changing the temperature of the body of a living animal by circulating the blood of said animal extracorporeally through a closed system comprising at least in part a heat exchanger and then returning blood of changed temperature to the animal, the improved heat exchanger which comprises a unitary, disposable, pre-sterilized blood conducting panel constructed of transparent, hemorepellant, sterilizable and heat sealable plastic material, said panel being provided with a single blood inlet, a single blood outlet and a plurality of elongated, tortuous, serpentine passages adapted to promote the exchange of heat energy between the blood and the outside environment, said passages communicating at one end with the single blood inlet and at the other end with the single blood outlet, the lumen of said passages having a slit-like shape which promotes the filming of the blood and the exchange of heat energy between the blood and the outside environment.

References Cited in the file of this patent

UNITED STATES PATENTS

| | | |
| --- | --- | --- |
| 363,423 | Schoenecker | May 24, 1887 |
| 2,548,359 | Gandhi | Apr. 10, 1951 |
| 2,595,328 | Bowen | May 6, 1952 |
| 2,606,005 | Poux | Aug. 5, 1952 |
| 2,876,769 | Cordova | Mar. 10, 1959 |

FOREIGN PATENTS

| | | |
| --- | --- | --- |
| 976,750 | France | Nov. 1, 1950 |
| 1,184,028 | France | Feb. 2, 1959 |